United States Patent [19]

Stone

[11] 4,221,423
[45] Sep. 9, 1980

[54] COVER FOR A VEHICLE BOX

[76] Inventor: Raymond J. Stone, 6960 Highway 9, Felton, Calif. 95018

[21] Appl. No.: 956,868

[22] Filed: Nov. 1, 1978

[51] Int. Cl.³ .............................................. B60P 7/02
[52] U.S. Cl. .................................. 296/100; 160/351; 296/210
[58] Field of Search .................. 296/137 B, 100, 26; 160/351

[56] References Cited

U.S. PATENT DOCUMENTS

| 2,602,693 | 7/1952 | Murphy | 296/137 B |
|---|---|---|---|
| 3,649,072 | 3/1972 | Cross | 296/137 B |
| 3,762,763 | 10/1973 | Deshores | 296/137 B |
| 3,768,858 | 10/1973 | Boismier | 296/137 B |
| 3,977,720 | 8/1976 | Schreiberg | 296/137 C |

*Primary Examiner*—John J. Love
*Assistant Examiner*—John A. Carroll
*Attorney, Agent, or Firm*—Huebner & Worrel

[57] ABSTRACT

A cover for a vehicle box, the cover having a plurality of transversely elongated rectangular panels successively interconnected in edge-to-edge relation for pivotal movement about axes extending parallel to and between their interconnected edges for folding the panels from a position covering the box starting at either of its longitudinal ends.

11 Claims, 11 Drawing Figures

COVER FOR A VEHICLE BOX

BACKGROUND OF THE INVENTION

1. Field of the Invention

The present invention relates to a cover for a vehicle box, and more particularly to such a cover which is especially adapted for covering the box of a "pickup" truck because of the convenience in folding the cover between a covering position and a plurality of open positions, in removing the cover from the box, and in reinstalling the cover on the box.

2. Description of the Prior Art

The prior art includes a variety of covers for vehicle boxes and the like. These covers have two basic and conflicting objectives. First, such a cover should cover effectively, that is, protect the contents of the box from the weather and from theft. Secondly, such a cover should open conveniently for access to all portions of the box. Satisfaction of both of these objectives is particularly difficult in the case of covers for the boxes of pickup trucks because these vehicles are commonly used to transport for relatively short distances items such as sporting equipment, hand tools, and packages to be delivered. These items are frequently relatively valuable and subject to weather damage. Frequent access to the box is usually required with such items not only because of the relatively short trips, but because all of the items transported are typically loaded and unloaded selectively rather than all at one time. The difficulty of satisfying both the closing and the opening functions is complicated by the great desirability of having a cover which is completely and easily removable so that the vehicle can transport items which are too large to fit under the cover.

PRIOR ART STATEMENT

Characterizing the closest prior art of which the applicant is aware and in compliance with 37 C.F.R. 1.97 and 1.98, attention is invited to the following patents which are relevant in their relation to vehicle covers having a plurality of panels. Copies of these patents are attached as follows:

| U.S. Pat. No. | Inventor | Date |
| --- | --- | --- |
| 2,602,693 | Murphy | July 8, 1952 |
| 3,649,072 | Cross | Mar. 14, 1972 |
| 3,762,763 | Deshores | Oct. 2, 1973 |
| 3,768,858 | Boismier | Oct. 30, 1973 |
| 3,977,720 | Schreiberg | Aug. 31, 1976 |

The Murphy patent discloses a closure having a plurality of sliding panels longitudinally of a vehicle in individual, vertically stacked tracks. The panels can be opened only from the rearward end of the vehicle.

The Cross patent discloses a pickup bed cover having a plurality of panels which uncover the bed by sliding forwardly under a roof panel permanently mounted above the forward end of the bed.

The Deshores patent discloses a cover for open bed vehicles having a pair of panels which slide longitudinally in stacked relation to uncover one end of the bed at a time.

The Boismier patent discloses a truck box cover having panels extending longitudinally of the box. The panels are disposed in two groups, one on each side of the truck, with the other panels of each group hinged to the corresponding side wall of the box.

The Schreiberg patent discloses a vehicle cover formed from a plurality of transversely extending panels. The forward panel is hinged to the vehicle, and the panels fold forwardly to open the vehicle from the rearward end.

SUMMARY OF THE INVENTION

Accordingly, it is an object of the present invention to provide an improved cover for a vehicle box.

Another object is to provide such a cover which does not impede access to the box when opened and which allows a vehicle box equipped therewith to be opened from either end.

Another object is to provide such a cover which provides convenient access to the vehicle box when mounted therein which effectively protects the contents of the box when in a closed position, and which can be removed entirely to allow the use of the box in a completely open condition.

Another object is to provide such a cover which prevents water leakage into the box when the cover is closed.

Another object is to provide such a cover which minimizes air resistance due to movement of a vehicle on which the cover is mounted.

Another object is to provide such a cover which can be locked in its closed position to prevent theft of the contents of the box.

Still another object is to provide a cover for a vehicle box which is relatively light in weight, economical, durable, and fully effective in performing its intended function.

DESCRIPTION OF THE PREFERRED EMBODIMENTS

First Form

Figures 1, 2, 3:
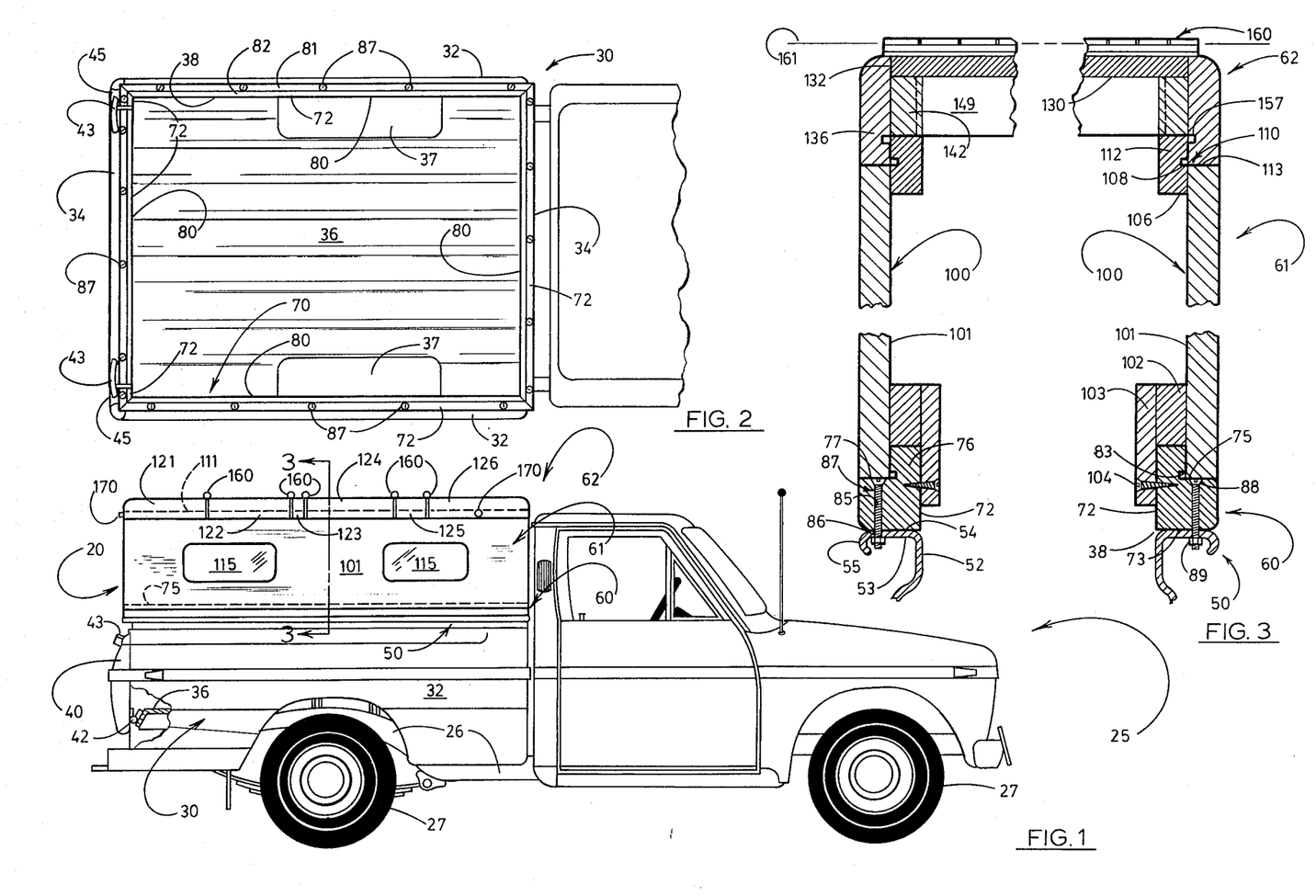
FIG. 1 is a side elevation of a first form of cover for a vehicle box embodying the principles of the present invention showing the cover mounted on a "pickup" truck with a small portion of the truck broken away to show its interior construction.
FIG. 2 is a top plan view of the cover showing a rectangular frame utilized with the cover mounted on a fragmentarily represented rearward portion of the truck.
FIG. 3 is a fragmentary, somewhat enlarged, vertical section of the cover taken on line 3—3 of FIG. 1 and transversely foreshortened for illustrative convenience.

Referring with greater particularity to the drawings, a first form of cover for a vehicle box embodying the principles of the present invention is shown in FIG. 1 and is generally indicated by the numeral 20. The cover is depicted in its operating environment mounted on a pickup truck 25 of conventional construction. The truck includes a frame 26 supported on ground traversing wheels 27.

The truck 25 has a substantially rectangular box 30 of well known form, best shown in FIGS. 1 and 2, mounted on the rearward portion of the frame 26. The box includes a pair of transversely opposite, longitudinally extending, substantially parallel side walls 32 and a pair of longitudinally opposite, transversely extending, substantially parallel end walls 34. The box has a floor 36 which includes a transversely spaced pair of wheel covers 37. The box is upwardly open, the upper portions of the side and end walls defining a rectangular opening 38 for access to the box.

Access to the box 30 is also obtained through a tailgate 40 which forms the central portion of the rearward wall of the pickup. The tailgate is mounted at its lower edge on the floor 36 of the box by a hinge 42 for pivotal movement about a transversely extending horizontal axis. The tailgate is provided with latches 43 for releasably securing it in an upright position. The tailgate extends transversely almost entirely the width of the box so that the rearward end wall thereof includes a pair of relatively short, transversely opposite end portions 45 extending from each side wall 32 toward the corresponding end of the tailgate.

The side walls 32 and end walls 34 have individual, upwardly disposed edges 50 which lie substantially in a common, horizontal plane. These edges, typically, are configured as shown in FIG. 3 wherein the edges each have a planar lower portion 52 which is a continuation of the portion of the respective wall below the edge. The edge includes a horizontal planar portion 53 extending outwardly of the box 30 from the upper end of said lower portion and presenting an upwardly disposed planar surface 54. A downwardly turned lip 55 is formed at the outer end of said horizontal portion. The cover 20 is adapted for mounting on the particular configuration of the upper edge just described. However, it is to be understood that a cover embodying the principles of the present invention can be mounted on other configurations of such upper edges.

The cover 20 of the first form of the present invention has three portions which can readily be detached from each other. These portions are a lower mounting portion 60 which is mounted on the walls 32 and 34 of the box 30, a central extension portion 61 which is mounted on the mounting portion, and an upper canopy portion 62 which is, in turn, mounted on the extension portion. The canopy portion has a closing position in which its elements are extended over the opening 38 of the box 30 as shown in FIGS. 1 and 3.

The mounting portion 60 of the cover 20 includes a substantially rectangular frame 70, best shown in FIGS. 2 and 3, formed from a plurality of elongated members 72. These members are individually mounted on and correspond to the forward of the end walls 34, the pair of side walls 32, the tailgate 40, and the end portions 45 of the rearward of the end walls. The elongated member or members on an end wall 34 form an end for the frame, and each elongated member mounted on a side wall 32 forms a side of the frame. The length of these members is equal to the length of the upper edge 50 of the corresponding wall element, and the members extend horizontally in coextensive relation therewith. Each of these members has a planar, downwardly disposed side 73 conforming to and engaged with the upper surface 54 of the corresponding upper edge of a side wall or end wall. Each member has an upwardly disposed side 75 of stepped configuration, having a raised edge 76 and a depressed edge 77 extending longitudinally of the member. The member is mounted with the raised edge disposed toward the opening 38 of the box. When the elongated members are mounted on the box and the tailgate 40 is closed, their upper sides provide an upwardly disposed, substantially horizontal surface 80 circumscribing said opening. This surface has an upwardly extending ridge or flange portion 81 formed by the raised edges of the elongated members. The flange portion circumscribes said opening in adjacent relation thereto. Said surface has a ledge portion 82 formed by the depressed edges of said members. The ledge portion circumscribes the flange portion and is outwardly disposed therefrom in relation to said opening.

The frame 70 has a first sealing groove 83 extending therearound and facing outwardly of the box at the junction of the flange portion 81 and ledge portion 82 of the surface 80. The groove extends into the flange portion and is disposed so that the lower side of the groove is an extension of the upper surface of the ledge portion.

Each of the elongated members 72 forming the frame 70 is provided with a plurality of bores 85 extending vertically therethrough between the depressed edge 77 and the lower side 73. The bores are spaced along the member and the portions of the bores adjacent to the depressed edge are countersunk. A plurality of bores 86 extend through the horizontal planar portions 53 of the upper edges 50 of the walls 32 and 34 in individual alignment with the bores in the elongated members. The frame is secured to said upper edges by a plurality of bolt assemblies 87 individually fitted in these aligned pairs of bores. The bolts have individual cone-shaped heads 88 seated in the countersunk portion of the bores in said members so that the heads do not project about the ledge portion 82 of the frame. The assemblies have shanks which project downwardly from the bores in said upper edges and are screwthreadably engaged by nuts 89 detachably to secure the mounting portion 60 of the cover on the trunk 25.

The extension portion 61 of the cover 20 is formed by four extension walls 100 individually corresponding to the side walls 32 and the end walls 34 of the box 30. The extension walls are mounted on the upwardly disposed surface 80 of the rectangular frame 70. Each wall includes a first vertical planar member 101 whose length is substantially equal to the length of its respective wall of the box. The vertical member extends upwardly from the frame 70 to approximately the level of the highest point of the track 25. As best shown in FIG. 3, the thickness of the planar member is approximately equal to the width of the depressed edge 77 of the upper side 75 of the elongated members 72. A rectangular bar 102 is mounted on each of said vertical members. The bar extends horizontally along the member somewhat above its lower edge on the side thereof disposed toward the opening 38 in the box. The thickness of the bar is substantially equal the thickness of the raised edge 76 of said upper side. A second vertical planar member 103 is mounted on the bar opposite the first planar member and extends downwardly from the top of the bar to a point below the lower edge of the first planar member. The two planar members and the bar of each extension wall thus define a downwardly disposed notch fitted to said raised edge for mounting the wall on its respective elongated member 72. The walls are secured to said member by a plurality of screws 104 which are spaced along the wall and extend horizontally in screwthreaded engagement through the second planar member and into the elongated member. When so mounted, the extension walls are disposed upwardly from their respective wall 32 or 34 of the box in substantially parallel extended relation to the wall.

The upper edge of each of the first planar members 101 has a rectangular box 106 extending along the edge on the side thereof disposed toward the opening 38 of the box 30. A portion of the bar is extended upwardly from said upper edge. The dimensions and proportions of this extended portion are substantially equal to those of the raised edges 76 of the elongated member 72, and this portion is provided with a sealing groove 108 corresponding to the first sealing groove 83 in the frame 70. Each extension wall, therefore, has an upper side 110 substantially identical to the upper side 75 of the corresponding elongated member and providing an upwardly disposed surface 111 circumscribing said opening. This surface has a flange portion 112 and a ledge portion 113 corresponding to the flange portion 81 and ledge portion 82 of the surface 80 of the frame 70.

Each of the first planar members 101 of the pair of extension walls 100 which correspond to the pair of side walls 32 of the box are provided with a pair of windows 115. The four extension walls can, of course, be provided with windows arranged in any other suitable manner.

Figures 4, 5, 6, 7, 8, 9:
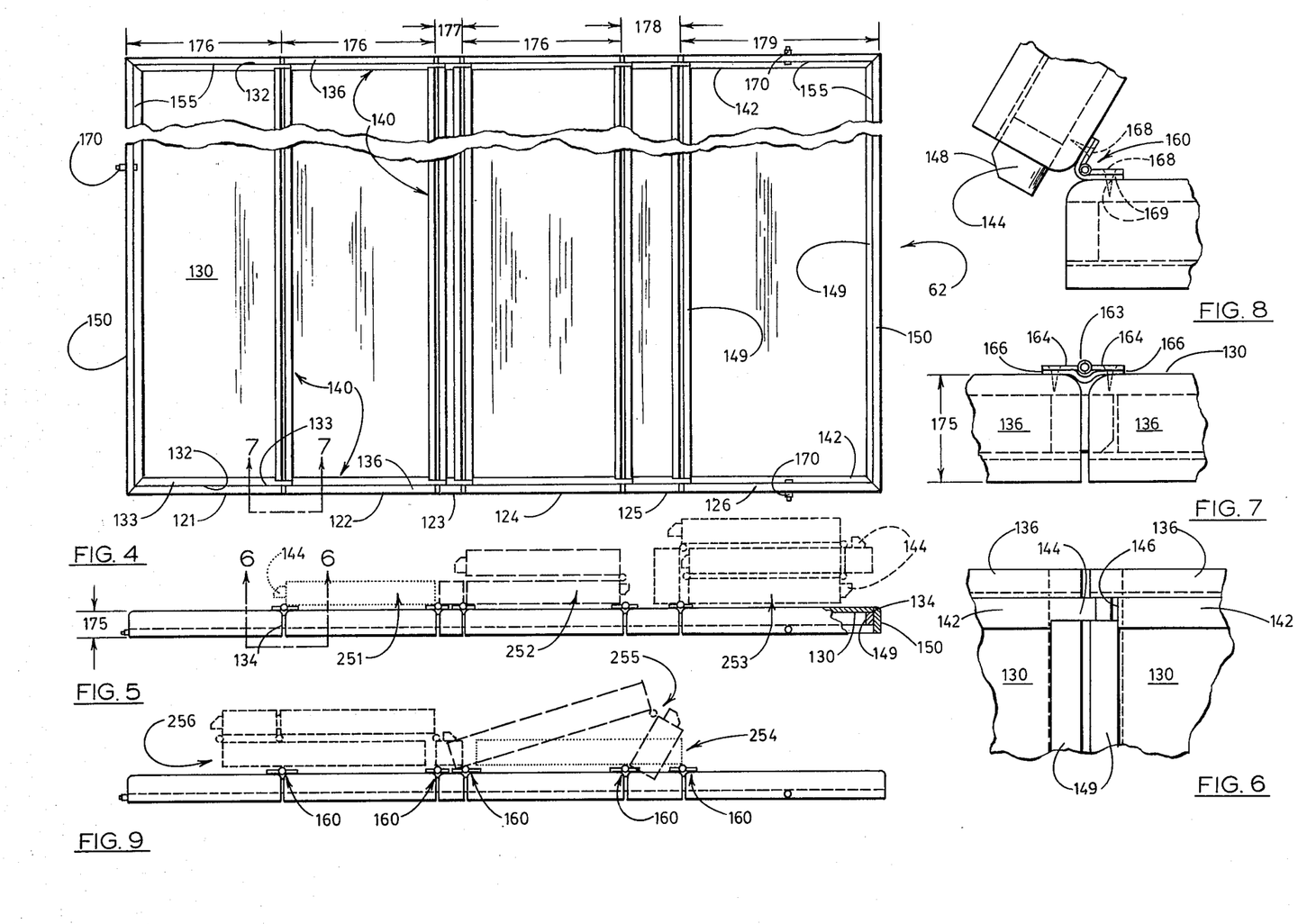
FIG. 4 is a somewhat enlarged bottom plan view of the cover of FIG. 1 foreshortened for illustrative convenience.
FIG. 5 is a side elevation of the cover showing two alternate folded positions of panels thereof in dashed lines.
FIG. 6 is a somewhat enlarged fragmentary bottom plan view taken on line 6—6 of FIG. 5.
FIG. 7 is a fragmentary side elevation taken on line 7—7 of FIG. 4.
FIG. 8 is a fragmentary view similar to FIG. 7 but showing the pair of panels of the cover in partially folded disposition.
FIG. 9 is a view similar to FIG. 5 showing two additional folded positions of panels of the cover in dashed lines.

The canopy portion 62 of the first form of cover 20 has six substantially rectangular panels which, when the canopy is in its covering position as shown in FIG. 1, extend longitudinally of the box in a single row and substantially in a common horizontal plane from end to end of the box 30 of the truck 25. The panels are indicated in sequence from the rearward of the end walls 34 of the box to the forward of the end walls by the respective numerals 121 through 126. In the covering position, the panel 121 is adjacent to the rearward of the end walls 34 of the box 30 and the panel 126 is adjacent to the forward of said walls so that these two panels are disposed at the ends of the rows of panels. The remaining panels are disposed between the panels 121 and 126. As shown in FIGS. 3 and 4, the panels are elongated transversely of the box and have substantially the same overall length which is substantially equal to the exterior transverse dimension of the frame 70. As best shown in FIG. 5, all of the panels have substantially the same overall vertical dimension or depth which is equal to a first predetermined distance. As shown in FIGS. 1, 4 and 5, and subsequently to be discussed in greater details, the panels have various widths measured longitudinally of the box. The sum of these widths is substantially equal to the exterior longitudinal dimension of the frame as shown in FIG. 1.

The details of construction of the panels 121 through 126 are best shown in FIGS. 3 through 8. Each panel has a planar back 130 which has a pair of substantially parallel ends or first edges 132 which extend parallel to the side walls 32 of the box 30 when the canopy portion 62 is mounted thereon in its closing position. Each first edge has a pair of opposite ends 133 which are spaced longitudinally oppositely of the box in said position. The back has a pair of substantially parallel second edges 134 which extend at right angles to said first edges and parallel to the end walls 34 of the box in said position. In the closing position the panels are disposed with their second edges in edge-to-edge relation so that the second edges of adjacent panels are disposed in juxtapositioned pairs. Each panel has a pair of bars 136 mounted on and extended along its first edge. The length of each bar is substantially equal to the length of its respective edge. Each bar is extended at substantially a right angle from the back of the panel and is disposed so as to extend downwardly from the back when the canopy portion is in its closing position. Each of these bars is thus disposed so as to form a ridge extended from a first edge of the back and out of the plane thereof.

Each of the panels 121 through 126 has a rectangular reinforcing frame 140 extending peripherally about its respective back 130. The frame is disposed on the side of the back which is downwardly disposed in the closing position of the canopy portion 62. This frame includes a pair of first bars 142 extending in parallel relation to the first edges 132 of said back and individually engaged with the corresponding bars 136 thereof on the sides of the bars disposed toward the center of the panel. The opposite ends of each of the first bars of the reinforcing frame thus correspond to the opposite ends 133 of the corresponding first edge of the back. One of these opposite ends of the reinforcing frame bar projects outwardly of the panel beyond its corresponding second edge 134, while the opposite end of said bar does not extend to its corresponding second edge. The outwardly extending one of said ends thus forms an extension 144 mounted on and downwardly of the corresponding respective first edge of the panel. Said opposite end forms a notch 146 extending inwardly of the panel. Each notch extends inwardly from its respective panel substantially the same distance as the extension projects outwardly from the panel. Therefore, each notch is fitted to receive one of said extensions of another panel. The lower, outwardly disposed end of each extension has a beveled surface 148 for a purpose subsequently to be described. Each reinforcing frame 140 includes a pair of second bars 149 which are parallel to the second edges 134 of its respective panel.

The panels 121 and 126, which are disposed, respectively, at the rearward end and at the forward end walls 34 of the box, each have a single bar 150. This bar is mounted on and extended along one of the second edges 134 of the respective back 130. The bar is disposed so that it is extended downwardly at substantially a right angle from the back when the canopy portion 62 is in its closing position. The length of each of the bars is substantially equal to the length of said one edge so that the bar forms a ridge extended along said edge out of the plane of the back. This ridge interconnects the ends of the bars 136 of the panel which are disposed adjacent to said one of the second edges. Each of the first bars 142 of the reinforcing frames 140 of the panels 121 and 126 has an end which is disposed toward said one of the second edges. This edge engages the corresponding second bar 149 of said frame and thus does not form an extension 144 or a notch 146 as do the other of the ends of said first bars.

As best shown in FIG. 3, the first bars 142 and the second bars 149 of the reinforcing frames 140 extend downwardly from the backs 130 of the panels a lesser distance than the bars 136 and 150 extend downwardly from the backs. As a result, the bars 136 and 150 form a flange 155 extending around the periphery of the canopy portion 62. This flange extends downwardly toward the ledge portion of the upper side 110 of the extension walls when the canopy portion is in its closing position. This flange is fitted to be received in circumscribing relation to the flange portion of said upper side or to the substantially identical portion 81 of the upper side 75 of the rectangular frame 70. The flange of the canopy portion is provided with a third sealing groove 157 which extends entirely around the canopy portion on its inner side in downwardly adjacent relation to the lower sides of the reinforcing frames.

As best shown in FIG. 4, the bars 136 and 150 form the corresponding edges of their respective panels 121 through 126. However, the panels 121 and 126 each have one edge not provided with one of said bars, and the panels 122, 123, 124, and 125 each have a pair of edges which are not provided with one of said bars. Said edges not provided with one of said bars extend transversely of the box 30 when the canopy portion 62 is in its closing position and are defined by the corresponding second edges 134 of the back 130 of their respective panels. Said second edges are disposed in juxtapositioned pairs when the canopy portion is in its covering position so that the panels are disposed in edge-to-edge relation.

Each second edge 134 of the juxtapositioned pairs thereof of the panels 121 through 126 is interconnected to the other of said edges by a hinge assembly 160 which defines a substantially horizontal pivotal axis 161 extending between and substantially parallel to said edges. The axis is disposed in upwardly adjacent relation to the backs 130 of the pair of the panels so interconnected when the canopy portion 62 is in its covering position. The hinge assembly includes an axially elongated or "piano" hinge 163 of well-known construction having a central pin aligned with said axis and a pair of planar members 164 pivotally interconnected by the pin. The planar members extend in individual parallel relation to said interconnected second edges. The hinge is disposed on the sides of the backs of its respective panels which are opposite the reinforcing frames 140. Each hinge assembly includes a substantially rectangular planar seal 166 formed of a resilient material such as rubber. The seal is substantially congruent with the planar members of the hinge and is disposed between them and said edges bridging any space between the edges. The opposite sides of the seal are engaged by the hinge and the backs 130 of the panels which are connected by the hinge. The hinge assembly is secured to the backs of its respective pair of panels by a plurality of screws which are spaced along its planar members and extend at right angles thereto. Each screw extends through an aligned pair of openings 169 in its respective planar member and seals into screwthreaded engagement with said backs so that the seal is clampled between the back and the planar members of the hinge.

The canopy portion 62 is provided with a plurality of lock assemblies 170 mounted in the panels 121 and 126, which are adjacent to the end walls 34 of the box 30 when the canopy portion is in its covering position. One of these assemblies is mounted on the panel 121 and a pair of the assemblies is mounted on the panel 126. The assembly mounted on the panel 121 is disposed transversely centrally of the box 30 in the second bar 149 of said panel which is rearwardly disposed when the canopy is in its said position. The pair of assemblies mounted on the panel 126 individually are disposed on the opposite first bars 142 of the panel. The locking assemblies are substantially identical to corresponding assemblies of a second form of cover and, for illustrative convenience, will subsequently be described in greater detail in connection with that form.

As mentioned previously, the panels 121 through 126 have various widths measured longitudinally of the box 30 when the canopy portion 62 is in its closing position. These widths are predetermined to permit the panels to be folded about the axes 161 out of their relative dispositions in the covering position of the canopy portion 62 into a plurality of folded positions which are depicted in dashed lines in FIGS. 5 and 9. The depth of all of the panels is substantially equal to a first predetermined distance, indicated by the numeral 175 in FIGS. 3 and 5. This depth is measured vertically when the canopy portion is in said position, is equal to the depth of the first bars 142 and second bars 149, and includes all of the elements of the canopy portion exclusive of the hinges 163 and seals 166. The panel 121 which is disposed at the rearward of the end walls 34 of the box 30, the panel 122 adjacent thereto, and the panel 124 have substantially the same width which is substantially equal to a second predetermined distance. The width of the panel 126, which is disposed at the end wall of the box opposite to that at which the panel 121 is disposed, is substantially equal to the sum of said first and second predetermined distances. The width of the panel 123 is substantially equal to its depth, or the first predetermined distance, and the width of the panel 125 is substantially equal to twice this distance.

Second Form

Figure 10:
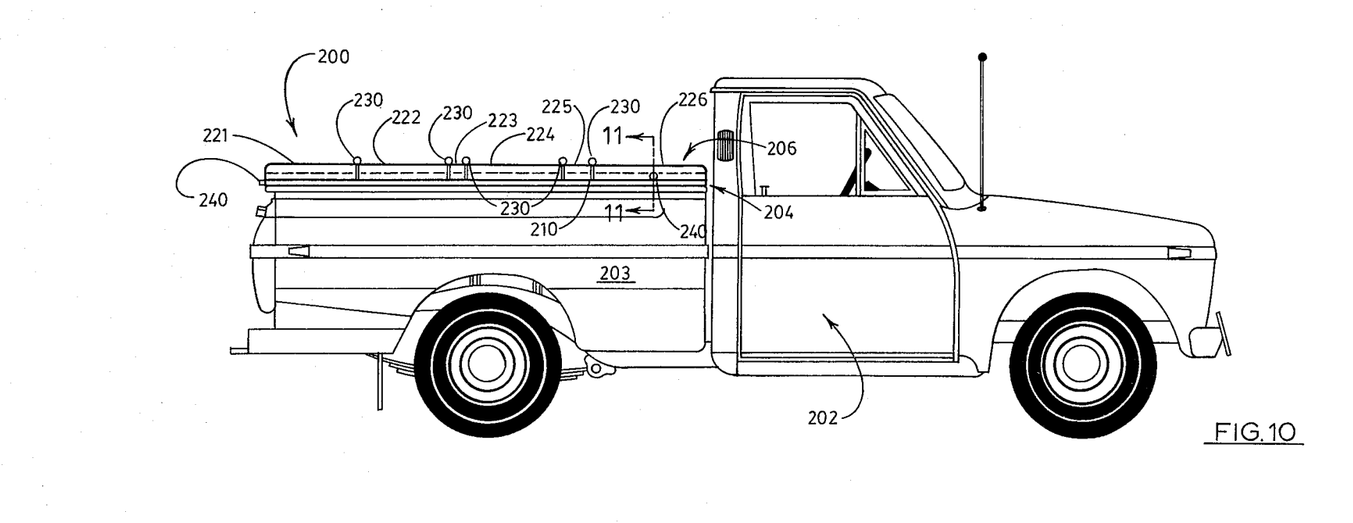
FIG. 10 is a side elevation of a second form of cover embodying the principles of the present invention mounted on a vehicle.
Figure 11:
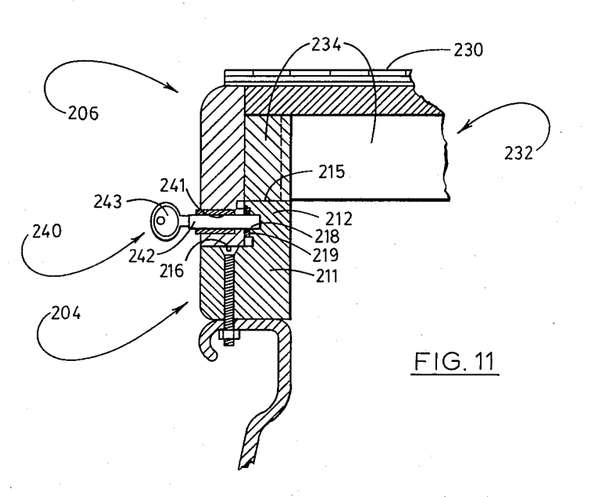
FIG. 11 is a somewhat enlarged fragmentary vertical section of the second form of the cover and portions of the vehicle taken on line 11—11 of FIG. 10 showing a lock for the cover.

A second form of cover 200 for a vehicle box embodying the principles of the present invention is shown in FIGS. 10 and 11. The cover is mounted on a represented truck 202 having a box 203. The truck is substantially identical to the truck 25 on which the cover 20 of the first form is mounted. The cover has a mounting portion 204 and a canopy portion 206 which are substantially identical, respectively, to the mounting portion 60 and the canopy portion 62 of the first form of cover. Therefore, the cover of the second form may be considered as the cover of the first form with the extension portion 61 omitted and the canopy portion mounted directly on the mounting portion. The canopy portion can be so mounted since the upper side 110 of the extension walls 100 is substantially identical to the upper side 75 of the rectangular frame 70.

The mounting portion 204 has a rectangular frame 210 formed by a plurality of elongated members 211 which, as shown in FIG. 11 have individual raised edges 212. These edges form a flange portion 215 and a ledge portion 216 of the frame which correspond, respectively, to the flange portion 81 and ledge portion 82 of the frame 70 of the first form of cover 20. The raised edges have three bores 218 extending horizontally therein and opening outwardly of the box 203. The bores are disposed in the raised edges in positions corresponding to the positions occupied by the lock assemblies 170 of the canopy portion 62 of the first form of cover. A washer 219 circumscribes the opening of each of the bores.

The canopy portion 206 has six panels indicated by the numerals 221 through 226 and individually corresponding to the panels 121 through 126 of the first form of cover 20. The panels are disposed in edge-to-edge relation with their juxtapositioned edges interconnected by hinge assemblies 230. Each panel has an reinforcing frame 232. These panels have bars 234, corresponding to the bars 136 and 150 of the first form of cover 20, which extend below their respective reinforcing frames. These bars form a flange extending around the periphery of the canopy portion and toward the ledge portion 216 of the frame 210 when it is in the covering position. This flange corresponds to the flange 155 of the first form of cover.

The canopy portion 206 is provided with three lock assemblies 240 of well-known construction which are mounted on the bores 218 of the panels 221 and 226 so as to be disposed in outwardly adjacent relation to the bores 218 in the rectangular frame 210 when the canopy portion is in its closing position. As shown in FIG. 11, each lock assembly has a bore 241 which is aligned axially with the corresponding bore 218 in the frame 210 when the canopy portion is in its closing position. A locking bolt 242 is slidably fitted in the bore 241 for axial movement through the washer 219 into and out of the bore 218. The bolt is provided with a lock mechanism, not shown, for securing the bolt in a locking position within the bore 218. This mechanism is actuated by the key 243 to release the bolt from said position. When in said position, the bolt secures its respective panel to the frame 210 of the mounting portion 204 thereby preventing folding of this panel out of its position occupied when the canopy portion 206 is in its closing position.

OPERATION

The operation of the described embodiments of the present invention is believed to be clearly apparent and is briefly summarized at this point.

Since the first form of cover 20 and the second form of cover 200 are substantially identical except that the first form includes the extension portion 61, a single description referring to the first form will suffice for both forms except where this portion is specifically involved. Either the first or the second form can, in fact, readily be converted to the other form. The first form is converted to the second form simply by removing the extension walls 100 from the first form. The reverse conversion is performed by removing the canopy portion 206, mounting the extension walls on the elongated members 211 of the frame 210, securing the walls to the members with the screws 104, and reinstalling the canopy portion. The second form can be utilized when the additional height above the vehicle box 30 or 203 provided by the extension walls is not required. The first form can be utilized whenever this height is needed or whenever a view into or out of the box through the windows 115 is desired.

The mounting portion 60 is installed on the box 30 of a truck 25 by forming the bores 86 in the horizontal planar portion 53 of the upper edge 50 of the walls 32 and 34 in any convenient manner. The lower sides 73 of the elongated members 72 of the mounting portion are then engaged with the upper surface 54 of said horizontal portion. The bolt assemblies 87 are then installed to secure the mounting portion on the box. Thereafter, the mounting portion can be quickly removed simply by removing the bolt assemblies and the elongated members, restoring the truck substantially to its original condition. The mounting portion can, of course, be reinstalled, when it is again desired to use the cover 20.

The canopy portion 62 is mounted in its closing position on the extension portion 61 by resting the panels 121 through 126 on the surface 111 formed by the upper sides 110 of the extension walls 100, as shown in FIGS. 1 and 3. When the panels are rested in this position they are disposed with the first edges 132 of the backs 130 aligned with the side walls 32 of the box 30 and with the sides of the rectangular frame 70 and with the second edges 134 aligned with the end walls 34 and the ends of said frame. When so aligned, the bars 136 and 150 extend downwardly from their respective edges of the panels toward the ledge portion 113 of the surface 111 in outwardly fitted relation to the flange portion 112 thereof. This overlapping fitted relation of these elements minimizes the leakage of rain water into the box 30 at the said surface where the canopy portion is rested on the extension portion. Leakage of rain water into the box is further inhibited by the second sealing groove 108 and the third sealing groove 157.

When the canopy portion 62 is mounted in its closing position as described, the edges of the panels 121 through 126 which extend transversely of the box 30 of the truck 25 are disposed so that said edges extend above the side walls 32 of the box. The first edges 132 of the panels thus extend above the surface 111 of the extension walls 100 and the surface 80 of the frame 70 on the transversely opposite sides of the opening 38 in the box. At the same time, the panels 121 and 126 which form the opposite ends of the row of panels are disposed above their corresponding end walls 34 of the box so that the said row extends above said end walls and so that one of the second edges 134 of each of the backs 130 of said end panels is disposed longitudinally oppositely of said opening above the surfaces 80 and 111.

Leakage of water into the box 30 through the cover 20 is minimized not only by the above described fitted relation of the canopy portion and sealing grooves 108 and 157 and extension portion, but by other elements of the cover 20. The raised edge 76 of the mounting portion 60 and notch formed by the planar members 101 and 103 of the extension portion are fitted together in overlapping weather barring relation in the manner similar to said fitted relation between the canopy and extension portions. Leakage in this area is also inhibited by the first sealing groove 83 in the mounting portion.

Leakage of rain water into the box 30 through the canopy portion 62 when it is in the closing position at the locations thereof where the panels 121 through 126 are interconnected is minimized by the flexible planar seals 166 of the hinge assemblies and by the fitted relation of the extensions 144 and notches 146 along the first edges 132 of the backs 130 of the panels, as best shown in FIGS. 6 and 7. Since these seals bridge any space between the juxtapositioned second edges 134 of the backs, water cannot enter such spaces from above through the corresponding piano hinge 163. Each extension 144 projects between the bar 136 along the corresponding first edge of the back of the adjacent panel and the first bar 142 of the reinforcing frame 140 of said panel. As a result, there is a double overlapping, weather barring, fitted relation of the extension into the corresponding notch 146 downwardly of the axis 161 of the corresponding hinge assembly 160. This relation effectively minimizes leakage transversely into the box 30 at this point. Each beveled surface 148 of an extension 144 is disposed thereon so that no portion of the extension protrudes a greater distance from the axis 161 about which the respective panel pivots than does the lower side of the respective reinforcing frame 140. This disposition prevents engagement of said extension with the extension portion 61 when said panel is pivoted toward and from the closing position of the canopy portion 62.

When the canopy portion 62 or 206 is in its closing position it is gravitationally rested, respectively, on the extension walls 100 of the extension portion 61 or on the frame 210 of the mounting portion 204. When the canopy portion is so rested, its upper side is substantially planar and closes the box 30 or 203. The canopy portion then presents a surface which is relatively smooth so as not to disturb the air flow over the truck. As a result, the cover minimizes air resistance due to movement of the truck.

The above described gravitational resting of the canopy portion 62 or 206 is sufficient to protect the contents of the box 30 from rain or from other adverse weather conditions. Protection of these contents from theft is provided by the lock assemblies 170 or 240 which selectively lock the end panels 121 and 126 or 221 and 226, respectively, to the extension walls 100 or to the frame 210. As shown in FIG. 11, each locking bolt is slid axially within its bore 241 into the bore 218 with which it is aligned. The bolt thus engages the extension portion 61 in the first form of cover 20 or the mounting portion 204 in the second form of cover 200 to attach the corresponding panel in the closing position. The key 243 can be utilized in a well-known manner to release the panel when desired. Locking of both of the end panels in the closing position of the canopy portion effectively retains the entire canopy portion in said position. This is because the intermediate panels 122 through 125 and 222 through 225 cannot be folded out of their closing position while these panels are, in effect, stretched between the end panels.

When all of the locking assemblies 170 or 240 are disengaged, respectively from the extension portion 61 or mounting portion 204, the canopy portion 62 or 206 can be completely removed from the box 30 or 203 simply by lifting it upwardly therefrom. In the second form of cover 200, access to the box through the frame 70 is then as unhindered as it was when no portion of the cover was installed on the box. With both forms the canopy portion can, of course, readily be reinstalled by again resting it on the extension portion or the mounting portion.

Although as previously described, the entire cover 20 or 200 or the entire canopy portion 62 or 206 thereof can readily be removed or replaced, it is frequently desired to transport articles under cover. Such articles are usually placed in the box 30 toward its rearward end because of the greater facility of access thereto provided by the tailgate 40. However, as when carrying a number of articles, it is often convenient to place articles toward the forward end of the box. As a result, access to either end of the box is often required without simultaneous access to the opposite end. The canopy portion of the cover of the present invention is, therefore, adapted to be folded upwardly from its covering position starting at either end by relative pivotal movement of the panels 121 or 126 about the axes 161 of the hinge assemblies 160. The panels can be folded into a number of positions, however, six of the most useful are depicted in FIGS. 5 and 9.

FIG. 5 shows three positions into which the canopy portion 62 can be folded starting with the panel 121 which is shown in FIG. 1 disposed at the rearward end of the box 30. In the first position, shown by dotted lines and indicated by the numeral 251, the panel 121 has been pivoted upwardly and forwardly from the closing position so as to rest in an inverted position on the panel 122. This first position provides an opening for access to the box equal to the width of the panel 121, that is, the first predetermined distance. In the second position, shown by relatively long dashed lines and indicated by the numeral 252, the panels 121, 122, and 123 have been further folded from the closing position. The attain the second position, panels 121 and 122 are first folded from the first position into an upright position about the one of the axes 161 between panels 122 and 123, and the panels 121 through 123 are then pivoted ninety degrees about the axis between panels 123 and 124. In the third position, shown in relatively short dashed lines and indicated by the numeral 253, the panels 121 through 125 have been folded from their closing position and rested on the panel 126 which alone remains in said position. The third position is attained by further folding of the panels from their second position in a manner similar to that in which the second position was attained from the first position. This further folding is performed by first pivoting panels 121 through 124 as a unit into an upright position above panel 125 about the axis between panels 124 and 125 and by then pivoting panels 121 through 125 as a unit ninety degress about the axis between panels 125 and 126. In the third position the panels are all stacked vertically at the forward end of the box allowing access vertically to the entire box except for the relatively small portion which width is equal to the width of panel 126.

The principle by which the various relative widths longitudinally of the box 30 of the panels 121 through 126 are determined so that the panels can be folded as just described into a succession of stacks to provide access to increasingly larger portions of the box can, of course, be employed with other numbers of panels than six. For instance, by using a greater number of panels the minimum uncovered portion of the box can be reduced, while by using four panels, the construction of the canopy portion 62 can be somewhat simplified. However, to stack the panels by folding in the general manner described it is preferred that there be at least four panels; that there be an even number of panels; that the overall depth of the panels be substantially the same and equal to a first predetermined distance; that the width of the panel disposed at one end of the box in the closing position, panel 121 in the described embodiment, be substantially equal to a second predetermined distance; that the panel disposed at the opposite end of the box, panel 126 in the described embodiment, have a width substantially equal to the sum of these distances; that the width of alternate panels between said panels be substantially the same and also substantially equal to the second predetermined distance; and that the remaining panels, starting at the one thereof toward said one end of the box, have widths which increase successively by an increment substantially equal to said first predetermined distance. The relation of the widths of said remaining panels is illustrated by panels 123 having a width equal to its depth while panel 125 has a width equal to twice its depth. The widths of each of said remaining panels can also be expressed mathematically by the formula $D(N-1/2)$ where D represents the first predetermined distance and N represents the position of the panel numbered from and including the panel at said one end of the box.

FIG. 9 shows three positions into which the canopy portion 62 can be folded starting with the panel 126 disposed at the forward end of the box 30 in FIG. 1. In the fourth position, shown by dotted lines and indicated by the numeral 254, the panel 126 is folded upwardly and rearwardly so as to rest in parallel relation on the panels 124 and 125. In this position convenient access is provided to a portion of the box having a width equal to the width of the panel 126. Somewhat greater access is provided in the fifth position, shown in relatively long dashed lines and indicated by the numeral 255. In this position the edge of the panel 126 is disposed above the one of the hinge assemblies 160 interconnecting the panels 123 and 124. Since the width of panels 125 and 126 together exceed the width of panel 124, these two panels are inclined upwardly rather than being parallel to the other panels. In the sixth position, shown in relatively long dashed lines and indicated by the numeral 256, panels 123 through 126 are folded into a position giving access vertically to the forward portion of the box. While the folded panels are parallel to the remaining panels in this position, they cannot assume the stacked disposition of the first three positions 251 through 253. This is not normally an inconvenience since the previously described more convenient access to the box from its rearward end results in lengthy articles being loaded from that end. In any event since the canopy portion 62 is transversely and longitudinally symmetrical, it can be removed from the box and replaced thereon with the panel 121 at the forward end of the box and the panel 126 at its rearward end if it is desired to fold the panels into a position similar to the third position 253 but disposed at the opposite end of the box.

The cover 20 or 200 also provides simultaneous access to both ends of the box 30 of the truck 25 by folding the panel 121 or 221 into the first folded position 251 and simultaneously folding the panel 126 or 226 into the fourth folded position 254. Unless this simultaneous access is required, it is not necessary to unlock all of the lock assemblies 170 or 240, but only the assembly(ies) mounted on the panel at the end of the box to which access is desired.

Although the invention has been herein shown and described in what are conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. A cover for use with a substantially rectangular vehicle box having a pair of transversely spaced opposite side walls and a pair of longitudinally spaced opposite end walls defining an upwardly disposed opening comprising:
   A. means on the end walls and the side walls having a raised edge circumscribing the opening and a depressed edge extended inwardly of the raised edge providing an upwardly disposed recessed surface;
   B. a plurality of substantially rectangular panels, each panel having a pair of substantially parallel side edges and being disposed with one of said edges in juxtapositioned, parallel relation to one of said edges of another panel, the panels having a covering position in which they are disposed substantially in a common plane and have opposite ends rested on said surface of the depressed edge and fitted between the raised edge aligned transversely in a row extending longitudinally of the box; and
   C. hinge means interconnecting the juxtapositioned side edges of the panels for relative movement of the interconnected panels about axes extending parallel to and between their juxtapositioned edges and for folding the panels from said covering position starting with either end of the row thereof.

2. A cover for use with a substantially rectangular vehicle box having a pair of transversely opposite side walls and a pair of longitudinally opposite end walls defining an upwardly disposed opening comprising:
   A. a plurality of substantially rectangular panels, each panel having a pair of opposite edges and being disposed with one of said edges in juxtapositioned, parallel relation to one of said edges of another panel, the panels having a covering position in which they are disposed substantially in a common plane in a row extending longitudinally of the box across said end walls with the pair of panels at the opposite ends of the row disposed above the corresponding end walls and with said edges of the panels extending transversely of the box across said side walls;
   B. means individually interconnecting the juxtapositioned edges of the panels for relative movement of adjacent panels about axes extending parallel to and between their juxtapositioned edges and for folding the panels from said covering position starting with either panel of the pair thereof above the end walls; and
   C. a plurality of extension walls mounted on the box and extended upwardly in parallel, extended relation to the side and end walls of the box providing a surface circumscribing said opening for resting said panels in their covering position.

3. A cover for use with a substantially rectangular vehicle box having a pair of transversely opposite side walls and a pair of longitudinally opposite end walls defining an upwardly disposed opening comprising:
   A. a plurality of substantially rectangular panels, each panel having a pair of opposite edges and being disposed with one of said edges in juxtapositioned, parallel relation to one of said edges of another panel, the panels having a covering position in which they are disposed substantially in a common plane in a row extending longitudinally of the box across said end walls with the pair of panels at the opposite ends of the row disposed above the corresponding end walls and with said edges of the panels extending transversely of the box across said side walls;
   B. means individually interconnecting the juxtapositioned edges of the panels for relative movement of adjacent panels about axes extending parallel to and between their juxtapositioned edges and for folding the panels from said covering position starting with either panel of the pair thereof above the end walls; and C. a substantially rectangular frame mounted on the box providing a surface circumscribing said opening for resting said panels in their covering position, the frame having a plurality of elongated members disposed above and coextensive with said walls, each member having a downwardly disposed side mating with its respective wall and an upwardly disposed side bearing a portion of said surface.

4. A cover for use with a substantially rectangular vehicle box having a pair of transversely opposite side walls and a pair of longitudinally opposite end walls defining an upwardly disposed opening comprising:

A. means mounted on the box providing a surface circumscribing said opening, the surface having a ridge extended upwardly therefrom in circumscribing relation to said opening;

B. a plurality of substantially rectangular panels each panel having a pair of opposite edges and being disposed with one of said edges in juxtapositioned, parallel relation to one of said edges of another panel, the panels having a covering position in which they are rested on the surface and are disposed substantially in a common plane in a row extending longitudinally of the box across said end walls with the pair of panels at the opposite ends of the row disposed above the corresponding end walls and with said edges of the panels extending transversely of the box across said side walls, each of the panels having a pair of opposite ends which extend between said edges and are disposed above said surface transversely oppositely of said opening when the cover is in said position, said pair of panels disposed at the ends of the row in said position having a pair of individual edges disposed above said surface longitudinally oppositely of said opening when the cover is in said position, and said pair of opposite ends and said pair of edges having individual ridges extending therealong and downwardly therefrom defining a flange fitted in circumscribing relation to said ridges extending from said surface when the panels are rested thereon in said position; and C. means individually interconnecting the juxtapositioned edges of the panels for relative movement of adjacent panels about axes extending parallel to and between their juxtapositioned edges and for folding the panels from said covering position starting with either panel of the pair thereof above the end walls.

5. In combination with a substantially rectangular vehicle box having a pair of substantially parallel, longitudinally opposite ends walls and a pair of substantially parallel, transversely opposite side walls, the walls having individual, substantially horizontal and coplanar upper edges defining an upwardly disposed opening, a cover comprising:

A. a substantially rectangular frame mounted on the walls in engagement with said edges having ends and sides corresponding respectively to the end walls and side walls of the box and providing an upwardly disposed surface which includes an outer ledge portion circumscribing the opening and an inner flange portion extending upwardly from the ledge and circumscribing the opening between the ledge and the opening;

B. a plurality of substantially rectangular panels in which
 (1) each panel includes a generally planar back having a pair of opposite substantially parallel first edges spaced transversely of the box a distance substantially equal to the transverse exterior dimension of said ledge portion, the back bearing a pair of ridges individually coextensive with said first edges and extended therefrom out of the plane of the back,
 (2) the back has a pair of opposite, substantially parallel second edges spaced longitudinally of the box, the sum of the distances between said pairs of second edges of the panels being substantially equal to the longitudinal exterior dimension of the ledge,
 (3) the backs of a pair of the panels each bear a ridge coextensive with one of the second edges of said panels and extended from said one edge out of the plane of the back,
 (4) said panels having a covering position in which they are disposed in a row extending longitudinally of the box rested on said surface with their first edges aligned with the sides of the frame, with their second edges in substantially parallel edge-to-edge relation, with the pair of panels bearing a ridge on one of their second edges disposed at the opposite ends of the row, and with the ridges borne by the first and second edges extending downwardly toward said ledge portion in outwardly fitted relation to said flange portion; and C. means interconnecting each adjacent pair or second edges for relative pivotal movement of their respective panels about an axis extending substantially parallel to and between said edges in upwardly adjacent relation to the backs of their respective panels when said panels are disposed in the covering position.

6. The combination of claim 5 wherein the means interconnecting an adjacent pair of edges include an elongated flexible, planar seal disposed in coextensive, interconnecting relation between said adjacent pair of edges.

7. The combination of claim 6 wherein the means interconnecting an adjacent pair of edges of the panels comprise a piano hinge mounted on the backs of the corresponding panels oppositely of said ridges and the flexible seal is clamped between the hinge and said backs.

8. The combination of claim 5 in which:
A. the cover has an even number of at least four of said panels;
B. each panel has a predetermined width measured longitudinally of the box when the panel is disposed in its covering position;
C. the panels have substantially equal depths inclusive of their respective backs and ridges measured vertically when the panels are disposed in said position and equal to a first predetermined distance;
D. the panel which is disposed at one end of the row of panels when said panel is in its covering position has a width substantially equal to a second predetermined distance;
E. the panel which is disposed at the opposite end of said row has a width substantially equal to the sum of the first and the second predetermined distances;

F. the width of each alternate panel between the panels at the ends of the row starting with the panel adjacent to said panel at said one end of the row is substantially equal to the second predetermined distance; and G. the width of the remainder of the panels is defined by the formula $D(N-1/2)$ where N represents the relative position of the panel numbered from and including said panel at said one end of the row and D represents the first predetermined distance.

9. The combination of claim 5 wherein:

A. each panel of the pair thereof disposed at the opposite ends of the row of panels has a bore defined in one of the ridges borne by the back of said panel and extended horizontally toward the flange portion of the frame when said panel is in its covering position;

B. the flange portion of the frame has a plurality of bores defined therein individually disposed in alignment with the bores in the said end panels when the panels are in said position; and C. the cover includes a plurality of locking bolts individually related to each pair of aligned bores and sliding axially therein releasably to attach the cover to the frame.

10. The combination of claim 5 wherein:

A. the frame has a plurality of bores defined therein and extended vertically therethrough;

B. the upper edges of the walls of the box having a plurality of bores defined therein individually disposed in alignment with said bores in the frame; and C. a plurality of bolt assemblies are individually fitted through said pairs of aligned bores securing the frame to the box.

11. The combination of claim 5 wherein

A. each of said first edges has a pair of opposite ends which are disposed oppositely longitudinally of the box when the panels are in their covering position;

B. said ends of the transversely corresponding first edges of adjacent panels are disposed in juxtapositioned pairs when the adjacent panels are in said position;

C. one of said ends of each of said juxtapositioned pairs thereof has an extension projecting outwardly of its respective panel in substantially parallel relation to said first edges and the other end of each of said pairs has a notch extending inwardly of its respective panel and fitted to the extension; and D. the extension is received in the notch in weather barring relation transversely of the box and downwardly of said axis between the second edges of their respective panels when said adjacent pair of panels are in said position.

* * * * *

UNITED STATES PATENT AND TRADEMARK OFFICE
CERTIFICATE OF CORRECTION

PATENT NO. : 4,221,423
DATED : September 9, 1980
INVENTOR(S) : Raymond Jay Stone It is certified that error appears in the above-identified patent and that said Letters Patent are hereby corrected as shown below:

Column 4, line 51, delete "about" and insert ---above---;

Column 7, line 67, delete "clampled" and insert ---clamped---;

Column 8, line 63, insert a comma (,) after "Fig. 11".

Signed and Sealed this

Ninth Day of December 1980

[SEAL]

Attest:

SIDNEY A. DIAMOND

Attesting Officer

Commissioner of Patents and Trademarks